United States Patent
Danihelka et al.

(10) Patent No.: US 11,151,443 B2
(45) Date of Patent: Oct. 19, 2021

(54) AUGMENTING NEURAL NETWORKS WITH SPARSELY-ACCESSED EXTERNAL MEMORY

(71) Applicant: DeepMind Technologies Limited, London (GB)

(72) Inventors: Ivo Danihelka, London (GB); Gregory Duncan Wayne, London (GB); Fu-min Wang, London (GB); Edward Thomas Grefenstette, London (GB); Jack William Rae, London (GB); Alexander Benjamin Graves, London (GB); Timothy Paul Lillicrap, London (GB); Timothy James Alexander Harley, London (GB); Jonathan James Hunt, London (GB)

(73) Assignee: DeepMind Technologies Limited, London (GB)

( * ) Notice: Subject to any disclaimer, the term of this patent is extended or adjusted under 35 U.S.C. 154(b) by 1134 days.

(21) Appl. No.: 15/424,685

(22) Filed: Feb. 3, 2017

(65) Prior Publication Data

US 2017/0228638 A1 Aug. 10, 2017

Related U.S. Application Data

(60) Provisional application No. 62/292,169, filed on Feb. 5, 2016.

(51) Int. Cl.
*G06N 3/063* (2006.01)
*G06N 3/04* (2006.01)
*G06N 3/08* (2006.01)

(52) U.S. Cl.
CPC ........... *G06N 3/063* (2013.01); *G06N 3/0445* (2013.01); *G06N 3/082* (2013.01)

(58) Field of Classification Search
CPC ........ G06N 3/063; G06N 3/04; G06N 3/0445; G06N 3/08; G06F 12/123
See application file for complete search history.

(56) References Cited

U.S. PATENT DOCUMENTS 6,377,941 B1 4/2002 Steimle et al.
2017/0103305 A1* 4/2017 Henry .................... G06N 3/063

OTHER PUBLICATIONS

Graves, Alex, Greg Wayne, and Ivo Danihelka. "Neural turing machines." arXiv preprint arXiv:1410.5401 (2014). (Year: 2014).*

(Continued)

*Primary Examiner* — Li B. Zhen
*Assistant Examiner* — Markus A. Vasquez
(74) *Attorney, Agent, or Firm* — Fish & Richardson P.C.

(57) ABSTRACT

Methods, systems, and apparatus, including computer programs encoded on computer storage media, for augmenting neural networks with an external memory. One of the systems includes a sparse memory access subsystem that is configured to perform operations comprising generating a sparse set of reading weights that includes a respective reading weight for each of the plurality of locations in the external memory using the read key, reading data from the plurality of locations in the external memory in accordance with the sparse set of reading weights, generating a set of writing weights that includes a respective writing weight for each of the plurality of locations in the external memory, and writing the write vector to the plurality of locations in the external memory in accordance with the writing weights.

20 Claims, 4 Drawing Sheets

(56) References Cited

OTHER PUBLICATIONS

Weston, Jason, Sumit Chopra, and Antoine Bordes. "Memory networks." arXiv preprint arXiv:1410.3916 (2014). (Year: 2014).*
Robinson, John T., and Murthy V. Devarakonda. "Data cache management using frequency-based replacement." Proceedings of the 1990 ACM SIGMETRICS conference on Measurement and modeling of computer systems. 1990. (Year: 1990).*
Indyk and Motwani, "Approximate Nearest Neighbors: Towards Removing the Curse of Dimensionality," STOC '98 Proceedings of the thirtieth annual ACM symposium on Theory of computing, pp. 604-613, ACM Press, 1998.
EP Communication pursuant to Article 94(3) EPC in European Appln. No. 17710628.3, dated Feb. 25, 2020, 5 pages.
Graves et al. "Neural Turing Machines," arXiv preprint arXiv1410.5401v1, Oct. 20, 2014, 26 pages.
International Search Report and Written Opinion in International Application No. PCT/US2017/016415, dated Jun. 1, 2017, 16 pages.
Khalid. "The unconventional replacement algorithms," ACM SIGARCH computer architecture, 2 Penn Plaza Suite 701, New York, NY, Nol. 23, No. 5, Dec. 15, 1995, 7 pages.
Liu et al. "Sparse Convolutional Neural Networks," 2015 IEEE Conference on Computer Vision and Pattern Recognition, Jun. 7, 2015, 9 pages.
Muja et al. "Scalable nearest neighbor algorithms for high dimensional data," IEEE Transactions on Pattern Analysis and Machine Intelligence, 36.11, Nov. 1, 2014, 14 pages.
O'Neil et al. "The LRU-K page replacement algorithm for database disk buggering," Management of Data, ACM 2 Penn Plaza Suite 701, New York, NY, Jun. 1, 1993, 10 pages.
Rae et al. "Scaling Memory-Augmented Neural Networks with Sparse Reads and Writes," arXiV preprint arXiv 1610.09027, Oct. 27, 2016, 17 pages.

* cited by examiner

AUGMENTING NEURAL NETWORKS WITH SPARSELY-ACCESSED EXTERNAL MEMORY

CROSS-REFERENCE TO RELATED APPLICATION

This application claims priority to U.S. Provisional Application No. 62/292,169, filed on Feb. 5, 2016. The disclosure of the prior application is considered part of and is incorporated by reference in the disclosure of this application.

BACKGROUND

This specification relates to neural network system architectures.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

Some neural networks are recurrent neural networks. A recurrent neural network is a neural network that receives an input sequence and generates an output sequence from the input sequence. In particular, a recurrent neural network can use some or all of the internal state of the network from processing a previous input in computing a current output. An example of a recurrent neural network is a Long Short-Term Memory (LSTM) neural network that includes one or more LSTM memory blocks. Each LSTM memory block can include one or more cells that each include an input gate, a forget gate, and an output gate that allow the cell to store previous states for the cell, e.g., for use in generating a current activation or to be provided to other components of the LSTM neural network.

SUMMARY

This specification describes technologies that relate to augmented neural network systems, i.e., neural network systems that are augmented with an external memory.

A memory-augmented neural network system includes a neural network configured to receive a neural network input and generate a neural network output, an external memory, i.e., a memory that is external to the controller neural network, that stores values derived from portions of the neural network output, and a subsystem that is configured to receive portions of the neural network output and erase, write, and read from the external memory using the received portions.

In particular, to read from the external memory, the subsystem is configured to generate a sparse set of reading weights that includes a respective reading weight for each of the locations in the external memory using the neural network output and to read data from the locations in the external memory in accordance with the reading weights.

To write to the external memory, the subsystem is configured to generate a set of writing weights that includes a respective writing weight for each of the locations in the external memory and write a write vector to the locations in the external memory in accordance with the writing weights. In some implementations, the set of writing weights is also a sparse set of weights.

Generally, a sparse set of weights is a set of weights that includes only a small number, e.g., four, five, eight, or nine, non-zero weights and a large number of weights that are zero. For example, the external memory can have anywhere from on the order of two hundred locations, on the order of fifty thousand locations, to on the order of a million locations, with the reading weight only being non-zero for a small number, e.g., four, five, eight, or nine of those locations at any given time. In some cases, by distributing the memory across multiple computers, the memory may be able to include on the order of a billion locations.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

The subject matter described in this specification can be implemented in particular embodiments so as to realize one or more of the following advantages. By augmenting a neural network with an external memory, i.e., a memory that is external to the controller neural network, the augmented neural network can more accurately generate outputs from received inputs for a variety of machine learning tasks. In particular, in order to facilitate processing of a given input from a sequence of inputs, the augmented neural network can effectively use information generated by the augmented neural network during processing of many preceding inputs in the sequence by reading from the external memory. Similarly, in order to facilitate processing of subsequent inputs from the sequence, the augmented neural network can store information generated during processing of the current input in the external memory. Additionally, the size of the external memory can be increased without increasing the number of trainable parameters of the augmented neural network. Furthermore, because the entire mechanism for accessing the external memory can be treated as being differentiable, the memory-augmented neural network system can be trained efficiently.

As compared to other architectures for augmenting a neural network with an external memory, the system as described in this specification allows for more efficient interaction with the external memory by ensuring that the weights used to read and write from the external memory are sparse. This allows the system to read and write from the external memory more quickly and using fewer computing resources. In particular, by using the sparse reading and writing mechanisms described in this specification, run-time and memory overhead can be decreased while maintaining a high level of accuracy in the outputs generated by the system.

Additionally, the time and computing resources required to train the controller neural network can be reduced, both because reading and writing is also sparse during training, but also because sparse reads and writes result in fewer gradients needing to be computed and backpropagated through the controller neural network during the training.

The details of one or more embodiments of the subject matter of this specification are set forth in the accompanying drawings and the description below. Other features, aspects,

BRIEF DESCRIPTION OF THE DRAWINGS

Like reference numbers and designations in the various drawings indicate like elements.

DETAILED DESCRIPTION

Figure 1:
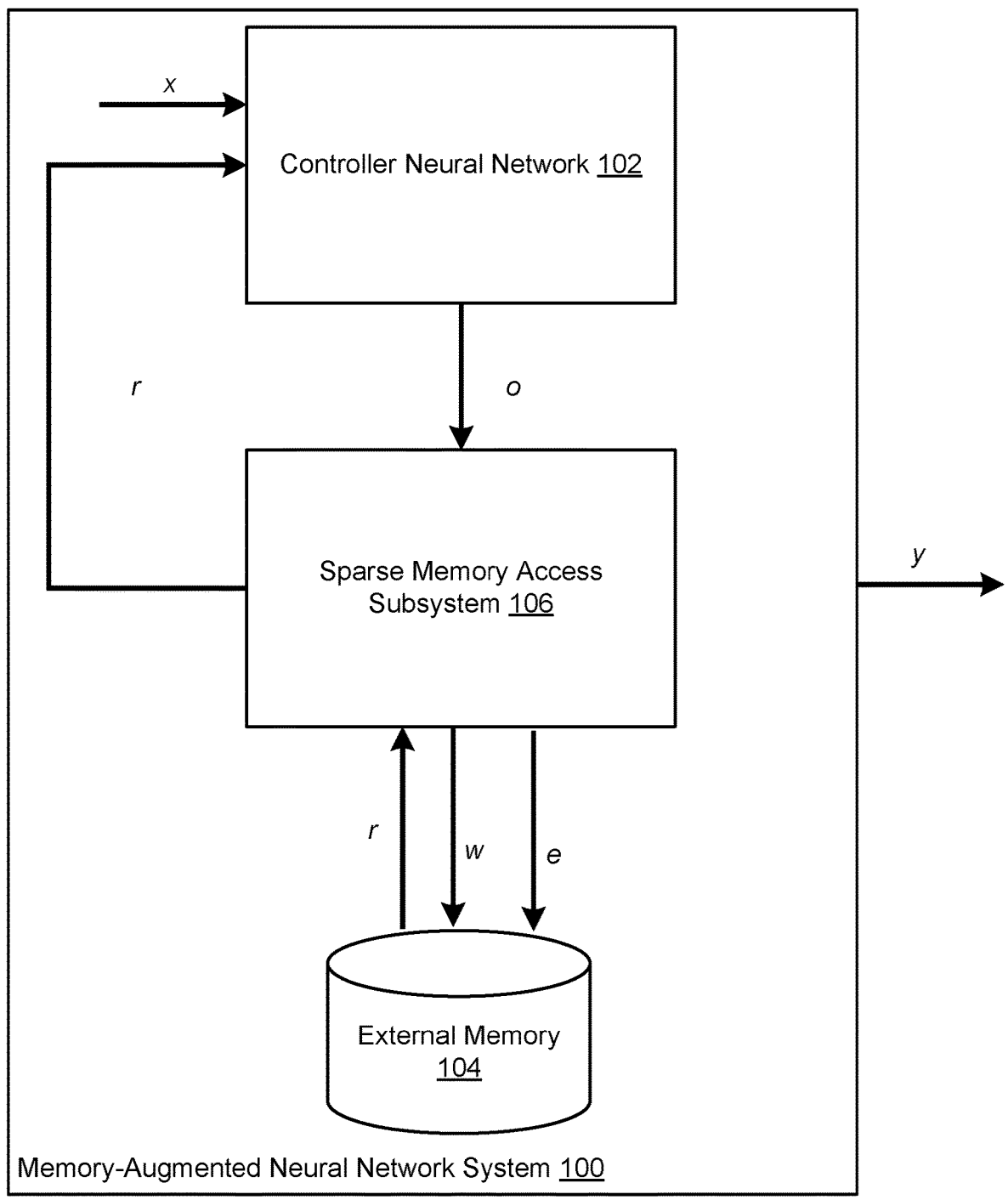
FIG. 1 shows an example augmented neural network system.

FIG. 1 shows an example augmented neural network system 100. The memory-augmented neural network system 100 is an example of a system implemented as computer programs on one or more computers in one or more locations, in which the systems, components, and techniques described below are implemented.

The memory-augmented neural network system 100 is a machine learning system that receives a sequence that includes a respective system input at each of multiple time steps and generates a sequence of system outputs from the system inputs. For example, the memory-augmented neural network system 100 can receive a system input x at a given time step in an input sequence and generate a system output y for the time step from the system input x.

The memory-augmented neural network system 100 can store the generated sequence of outputs in an output data repository or provide the output for use for some other immediate purpose, e.g., for presentation to a user or for further processing by another system.

The memory-augmented neural network system 100 can be configured to receive any kind of digital data input and to generate any kind of score, classification, or regression output based on the input.

For example, if the inputs to the memory-augmented neural network system 100 are images or features that have been extracted from images, the output generated by the memory-augmented neural network system 100 for a given image may be scores for each of a set of object categories, with each score representing an estimated likelihood that the image contains an image of an object belonging to the category.

As another example, if the inputs to the memory-augmented neural network system 100 are Internet resources (e.g., web pages), documents, or portions of documents or features extracted from Internet resources, documents, or portions of documents, the output generated by the memory-augmented neural network system 100 for a given Internet resource, document, or portion of a document may be a score for each of a set of topics, with each score representing an estimated likelihood that the Internet resource, document, or document portion is about the topic.

As another example, if the inputs to the memory-augmented neural network system 100 are features of an impression context for a particular selectable content item, the output generated by the memory-augmented neural network system 100 may be a score that represents an estimated likelihood that the particular selectable content item will be selected e.g., clicked on.

As another example, if the inputs to the memory-augmented neural network system 100 are features of a personalized recommendation for a user, e.g., features characterizing the context for the recommendation, e.g., features characterizing previous actions taken by the user, the output generated by the memory-augmented neural network system 100 may be a score for each of a set of content items, with each score representing an estimated likelihood that the user will respond favorably to being recommended the content item.

As another example, if the input to the memory-augmented neural network system 100 is text in one language, the output generated by the memory-augmented neural network system 100 may be a score for each of a set of pieces of text in another language, with each score representing an estimated likelihood that the piece of text in the other language is a proper translation of the input text into the other language.

As another example, if the input to the memory-augmented neural network system 100 is a spoken utterance, a sequence of spoken utterances, or features derived from one of the two, the output generated by the memory-augmented neural network system 100 may be a score for each of a set of pieces of text, each score representing an estimated likelihood that the piece of text is the correct transcript for the utterance or sequence of utterances.

As another example, the memory-augmented neural network system 100 can be part of a speech synthesis system.

As another example, the memory-augmented neural network system 100 can be part of a video processing system.

As another example, the memory-augmented neural network system 100 can be part of a dialogue system.

As another example, the memory-augmented neural network system 100 can be part of an autocompletion system.

As another example, the memory-augmented neural network system 100 can be part of a text processing system.

As another example, the memory-augmented neural network system 100 can be part of a reinforcement learning system.

As another example, if the inputs to the memory-augmented neural network system 100 are images, the output generated by the system may be a score for each of a set of pieces of text, each score representing an estimated likelihood that the piece of text is text that is present in the input image.

As another example, if the inputs to the memory-augmented neural network system 100 are pieces of code from a computer program, the output generated by the system may identify a predicted output of the computer program.

In particular, the memory-augmented neural network system 100 includes a controller neural network 102 and an external memory 104. The controller neural network 102 may be a feedfoward neural network or a recurrent neural network, e.g., a shallow or deep long short-term memory (LSTM) neural network, that is configured to receive a neural network input and process the controller neural network input to generate a neural network output.

Generally, the neural network input received by the controller neural network 102 is a combination of the current system input and data read from the external memory by a sparse memory access subsystem 106. For example, the controller neural network 102 may be configured to receive the current system input x and data r read from the external memory 104 and to generate a neural network output o that is provided to the sparse memory access subsystem 106.

The sparse memory access subsystem 106 receives outputs generated by the controller neural network, e.g., the output o, and translates the received outputs into erase, read, and write operations to be performed on the external memory 104. That is, the sparse memory access subsystem 106 receives an output o from the controller neural network 102 and, based on the output o, erases data e from the external memory 104, writes data w to the external memory 104, and reads data r from the external memory 104. The data read by the sparse memory access subsystem 106 can then be provided to the controller neural network 102 as a portion of a later neural network input, e.g., along with a system input.

The sparse memory access subsystem 106 also generates a system output y from the data r read from the external memory, the neural network output o, or both.

In particular, in some implementations, the sparse memory access subsystem 106 provides the read data r as the system output y.

In some other implementations, the sparse memory access subsystem 106 processes the read data r through one or more output neural network layers, e.g., one or more linear layers, to generate the system output y.

In some other implementations, the sparse memory access subsystem 106 combines, e.g., concatenates or sums, the neural network output o and the read data r, and then either provides the combination as the system output y or processes the combination through one or more output neural network layers, e.g., one or more linear layers, to generate the system output y.

In yet other implementations, the neural network output o includes an output portion that is different from the portions used to read, write, and erase from the external memory 104. In these implementations, the sparse memory access subsystem 106 can either provide the output portion as the system output y or process the output portion through one or more output neural network layers, e.g., one or more linear layers, to generate the system output y.

Generally, the neural network output o includes a write portion for use by the sparse memory access subsystem 106 in writing to the external memory 104 and a read portion used by the sparse memory access subsystem 106 to read from the external memory 104.

The external memory 104 stores data vectors written to the external memory 104 by the sparse memory access subsystem 106. In some implementations, the external memory 104 is a real-valued matrix memory that has elements $M(i,j)$, where i indexes location and j indexes the vector element. Thus, $M(i,j)$ would be the value stored at element j of the vector stored at location i in the external memory 104. By configuring the external memory 104, the sparse memory access subsystem 106, and the controller neural network 102 as described in this specification, the components of the memory-augmented neural network system 100 can be treated as being entirely differentiable, allowing the memory-augmented neural network system 100 to be effectively trained.

Figure 2:
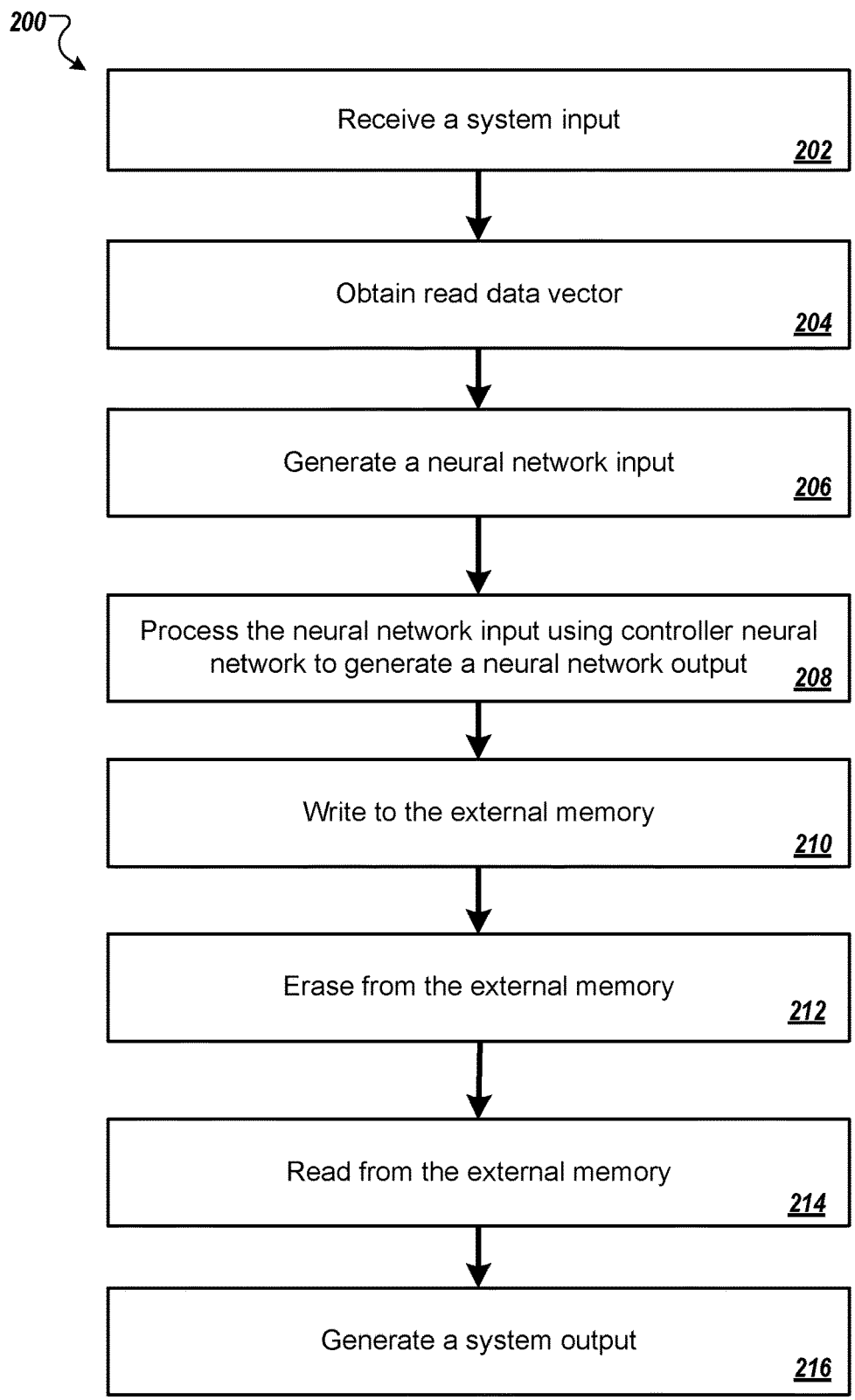
FIG. 2 is a flow diagram of an example process for generating a system output from a system input.

FIG. 2 is a flow diagram of an example process 200 for generating a system output for a given time step from a system input for the time step. For convenience, the process 200 will be described as being performed by a system of one or more computers located in one or more locations. For example, a memory-augmented neural network system, e.g., the memory-augmented neural network system 100 of FIG. 1, appropriately programmed in accordance with this specification, can perform the process 200.

The system receives a system input for the time step (step 202). The system input is one of a sequence of system inputs received by the system.

The system obtains a read data vector generated by reading from an external memory (step 204), e.g., the external memory 104 of FIG. 1. Generally, the read data vector was generated by the system by reading from the external memory during processing of the preceding input in the sequence of system inputs, i.e., during processing of the system input at the preceding time step.

The system generates a neural network input for the time step by combining the system input and the data read from the external memory (step 206). For example, the system can concatenate the system input and the read data vector to generate the neural network input. For the first system input, i.e., the system input at the first time step, the system can concatenate the system input with a pre-determined vector, e.g., a learned state of the controller neural network.

The system processes the neural network input using a controller neural network, e.g., the controller neural network 102 of FIG. 1, to generate a neural network output for the time step from the neural network input (step 208).

Depending on the implementation, the controller neural network can either be a feed-forward neural network, e.g., a convolutional neural network or another kind of deep feed-forward neural network, or a recurrent neural network, e.g., an LSTM neural network. If the controller neural network is a recurrent neural network, the recurrent neural network also uses the internal state of the recurrent neural network from the preceding neural network input in the sequence in processing the current neural network input to generate the neural network output. In some implementations, the controller neural network includes both recurrent and feed-forward layers.

The system writes to the external memory using a write portion of the neural network output (step 210). The write portion of the neural network output is a predetermined portion of the neural network output that has been designated as the portion to be used in writing to the external memory.

In particular, in order to write to the external memory, the system determines writing weights using the write portion of the neural network output and writes a write vector to the external memory in accordance with the writing weights.

Determining writing weights and writing to the external memory is described in more detail below with reference to FIG. 4.

The system erases from the external memory (step 212). In particular, as will be described in more detail below with reference to FIG. 4, the system erases from the least recently used location in the external memory using an erase vector.

The system reads from the external memory using a read portion of the neural network output to generate a read vector (step 214). The read portion of the neural network output is a predetermined portion of the neural network output that has been designated as the portion to be used in reading from the external memory.

In particular, the system determines reading weights using the read portion of the neural network output and then reads from the locations in the external memory in accordance with the reading weights.

Determining reading weights and reading from the external memory is described in more detail below with reference to FIG. 3.

The system can perform the erase, read, and write operations in any order. For example, in some implementations, the system erases, then writes, and then reads from the external memory. However, in other implementations, the system can perform these operations in a different order. In principle, one or more of the erase, read, or write operations may not be required at a particular time step.

The system generates a system output for the time step (step 216).

In some implementations, the system provides the data read from the external memory as the system output.

In some other implementations, the systems processes the data read from the external memory through one or more output neural network layers, e.g., one or more linear layers, to generate the system output.

In some other implementations, the system combines, e.g., concatenates or sums, the neural network output and the read data and then processes the combination through one or more output neural network layers, e.g., one or more linear layers, to generate the system output.

In yet other implementations, the neural network output includes an output portion that is different from the portions used to read, write, and erase from the external memory. In these implementations, the system can either provide the output portion as the system output or process the output portion through one or more output neural network layers, e.g., one or more linear layers, to generate the system output.

The process 200 can be performed for each system input in a sequence of system inputs to generate a sequence of system outputs for the sequence of system inputs.

The sequence of system inputs can be a sequence for which the desired output, i.e., the output sequence that should be generated by the system for the input sequence, is not known. The system can also perform the process 200 on inputs in a set of training data, i.e., a set of inputs for which the output that should be predicted by the system is known, in order to train the components of the system, i.e., to determine trained values for the parameters of the controller neural network and any additional parameters of processes used in erasing, writing, and reading from the external memory. Because the components of the system are entirely differentiable, the process 200 can be performed repeatedly on inputs selected from a set of training data as part of a conventional machine learning training technique to train the controller neural network, e.g., a backpropagation through time training technique if the controller neural network is a recurrent neural network or a stochastic gradient descent with backpropagation technique if the controller neural network is a feedforward neural network.

Figure 3:
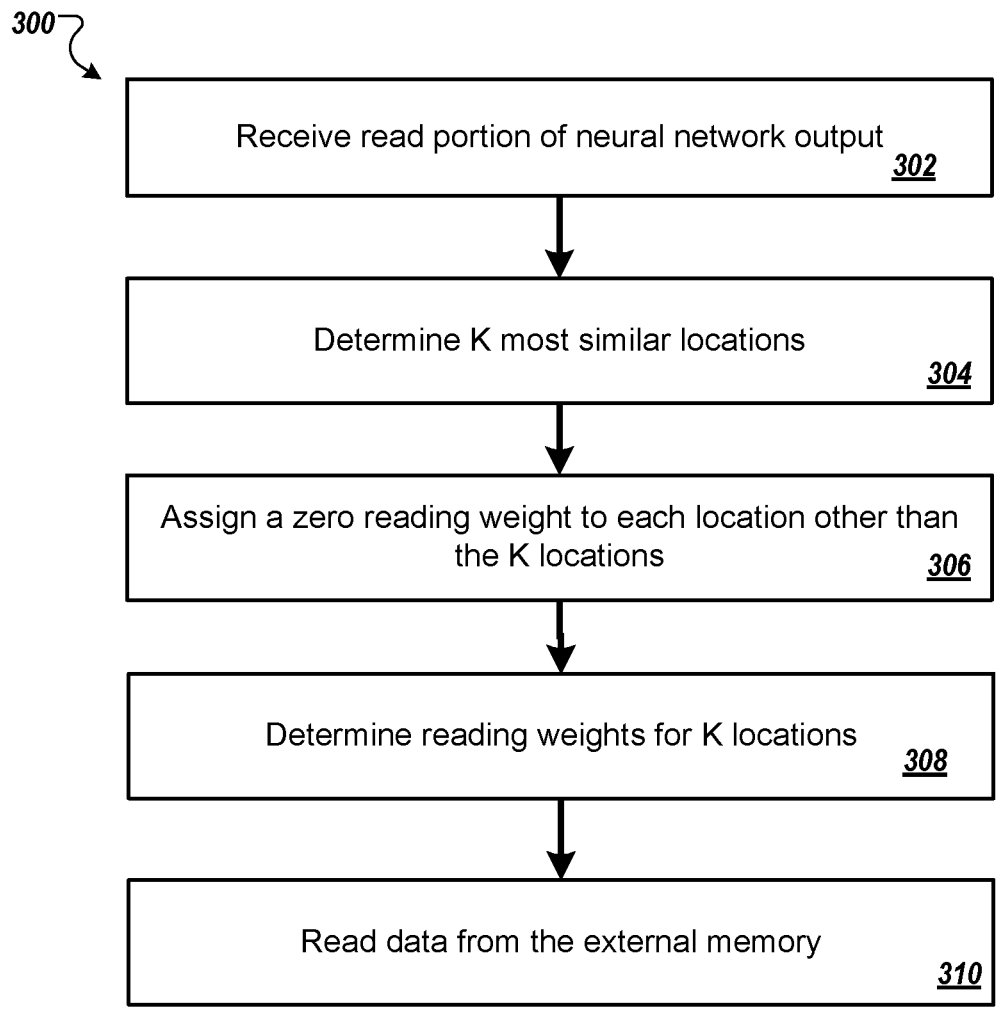
FIG. 3 is a flow diagram of an example process for reading from an external memory.

FIG. 3 is a flow diagram of an example process 300 for reading from an external memory. For convenience, the process 300 will be described as being performed by a system of one or more computers located in one or more locations. For example, a memory-augmented neural network system, e.g., the memory-augmented neural network system 100 of FIG. 1, appropriately programmed in accordance with this specification, can perform the process 300.

The system receives a read portion of the neural network output (step 302). In some implementations, the read portion includes a read key. In some other implementations, the system processes the read portion through one or more projection layers to generate the read key. The read key is a vector of values that has the same dimensionality as the vectors stored in the external memory.

The system determines the K locations in the external memory that are most similar to the read key according to a similarity measure, e.g., cosine similarity or Euclidean distance (step 304). Generally, K is a predetermined integer that is small relative to the number of locations in the external memory. For example, K can be equal to four or to eight, while the external memory can have anywhere from on the order of two hundred locations to on the order of fifty thousand locations.

In some implementations, the system determines a respective similarity measure between the read key and each of the locations in the external memory and selects the K most similar locations based on the similarity measures.

In some other implementations, however, to decrease the time and computing resources required to determine the reading weights by avoiding the need to determine all of the similarity measures, the system determines the K most similar locations using a k-nearest neighbors technique or, for additional time and computing resource savings, an approximate nearest neighbor technique.

In particular, in some implementations, when querying the memory to determine the K most similar locations, the system can use an approximate neural network index (ANN) to search over the external memory for the K most similar locations. This may be done by indexing the datapoints in a hierarchical (or tree-based) structure to search for nearby points via comparison-based search, or via locality sensitive hash (LSH) functions that map points into buckets. An example of a tree-based structure that can be employed is described in Muja, Marius and Lowe, David G. Scalable nearest neighbor algorithms for high dimensional data. Pattern Analysis and Machine Intelligence, IEEE Transactions on, 36, 2014. An example of a LSH approach that can be employed is described in Piotr Indyk and Rajeev Motwani, Approximate nearest neighbors: towards removing the curse of dimensionality, In Proceedings of the thirtieth annual ACM symposium on Theory of computing (STOC '98). ACM, New York, N.Y., USA, 604-613.

The system assigns a zero reading weight to each location in the external memory other than the K locations (step 306). That is, the system sets the reading weight to each other location to zero.

The system determines the reading weights for the K locations from the similarity measure between the locations and the read key (step 308).

In particular, the reading weight for the i-th location in the external memory $M(i, \bullet)$ may satisfy:

$$w(i) = \frac{f(d(k, M(i, \bullet, t)))}{\sum_{j=1}^{L} f(d(k, M(j, \bullet, t)))},$$

where $d(k, M(j, \bullet, t))$ is the similarity measure between the read key and the vector stored at the j-th location in the external memory, f is a differential monotonic transformation, e.g., a softmax, and L is the total number of locations in the external memory.

However, because the reading weights for all of the locations in the external memory except the K locations have been set to zero, the system only needs to calculate $f(d(k, M(i, \bullet, t)))$ for each of the K locations, i.e., and not for all of the locations in the external memory, reducing the computation time and the amount of computational resources necessary to determine the reading weights.

Once calculated in this manner, the reading weights are sparse, i.e., only the K weights corresponding to the K most similar locations are non-zero.

The system reads data from the external memory in accordance with the reading weights to generate a read data vector (step 310).

In particular, the system generates a read data vector by combining the vector stored at each location in the external memory in accordance with the final reading weights. That is, the system computes a weighted sum of each vector stored in the external memory, with the weight for each vector being the final reading weight for the corresponding memory location, i.e., for the memory location where the vector is stored.

Because the weight for each location other than the K locations is zero, the system can efficiently compute the weighted sum, i.e., because the system only needs to consider the K locations with non-zero weights when determining the weighted sum.

Figure 4:
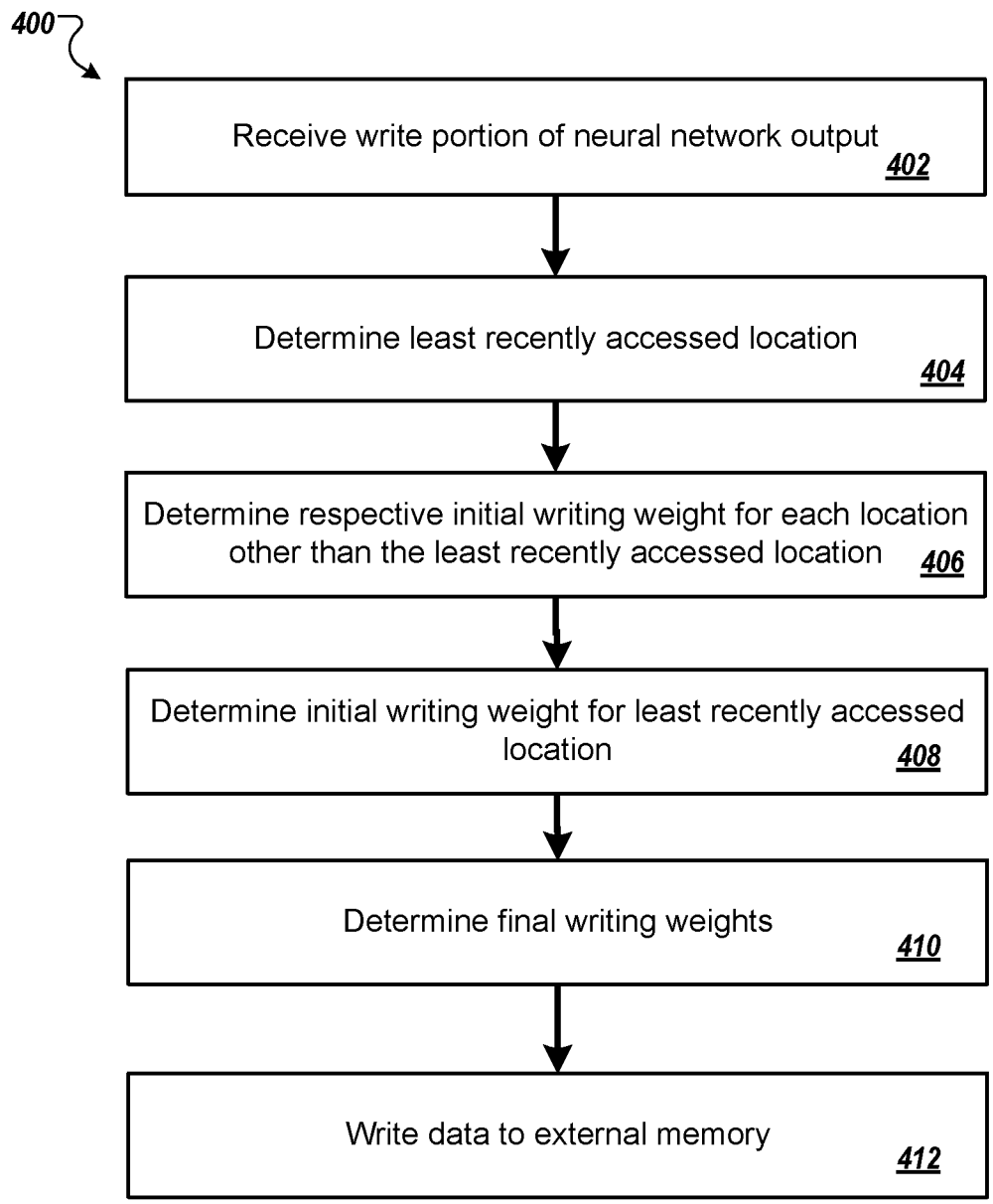
FIG. 4 is a flow diagram of an example process for writing to the external memory and erasing from the external memory.

FIG. 4 is a flow diagram of an example process 400 for writing data to the external memory and erasing data from the external memory. For convenience, the process 400 will be described as being performed by a system of one or more computers located in one or more locations. For example, a memory-augmented neural network system, e.g., the memory-augmented neural network system 100 of FIG. 1, appropriately programmed in accordance with this specification, can perform the process 400.

The system receives a write portion of the neural network output (step 402). In some implementations, the write portion of the neural network output includes a write vector, an interpolation gate parameter, and a write gate parameter. In some other implementations, the system processes the write portion through one or more projection layers to generate the write vector, the interpolation gate parameter, and the write gate parameter.

The system determines the least recently accessed location in the external memory (step 404).

In particular, the system maintains a respective usage value for each of the locations in the external memory and selects the location having the smallest usage value as the least recently accessed location.

In some implementations, the respective usage value for each of the locations is a time discounted sum of the weights for the location for previous time steps.

In these implementations, the usage value U(i) of the i-th location at time step T satisfies:

$$U(i) = \sum_{t=0}^{T} \lambda^{T-t}(w_t^W(i) + w_t^R(i)),$$

where $\lambda$ is a constant value, $w_t^W(i)$ is the writing weight for location i at time step t, and $w_t^R(i)$ is the reading weight for location i at time step t.

In some other implementations, the usage value for each of the locations is a number of time steps since a non-negligible memory access of the location.

In these implementations, the usage value for a given location at time step T is $t_{max}-T$, where $t_{max}$ is the largest time step for which the sum of the reading weight for the location at the time step and the writing weight for the location at the time step exceeded a predetermined threshold value, e.g., 0.001, 0.005, or 0.010.

The system determines a respective initial writing weight for each location other than the least recently accessed location from the reading weight for the location at the preceding time step and the interpolation gate parameter (step 406). Because the reading weights for the preceding time step are sparse as described above, the system can determine these initial writing weights by setting to zero the initial writing weight for each location other than the K locations with non-zero reading weights at the preceding time step and setting the initial writing weight for each of the K locations to the preceding reading weight for the location multiplied by the interpolation gate parameter.

The system determines an initial writing weight for the least recently accessed location by performing an interpolation between the reading weight for the location at the preceding time step and a constant value in accordance with the interpolation parameter (step 408). Generally, however, the reading weight for the least recently accessed location will be zero, i.e., because otherwise the location would have a usage value that indicates that it was very recently accessed, and the system can set the initial writing weight for the least recently used location to one minus the interpolation parameter.

The system determines the final writing weights for the locations by applying the write gate parameter to each of the initial writing weights (step 410). Generally, because the previous reading weights are sparse, the final writing weights are also a sparse set of writing weights. In particular, the sparse set of writing weight will generally have only one more non-zero value than the reading weights.

The system writes data defined by the write vector to the external memory in accordance with the final writing weights (step 412). That is, to write to a given location in the external memory, the system multiplies the write vector by the final writing weight for the location to determine an adjusted write vector for the location and then sums the vector currently stored at the location with the adjusted write vector for the location. However, because the final writing weights are sparse, the system can efficiently compute the weighted sum, i.e., because the system only needs to consider the locations with non-zero weights when determining the weighted sum.

The system erases data from the least recently used location in the external memory (step 414). In some implementations, the system subtracts a vector of all ones, i.e., a vector with each value being a one, from the vector currently stored at the least recently used location. In some other implementations, the system element-wise multiplies the vector currently stored at the least recently used location by a vector of zeroes.

After training, the system can use the processes 300 and 400 to read and erase from and write to the external memory in a computationally-efficient and time-efficient manner. During training, reading and erasing from and writing to the external memory using the processes 300 and 400 can also improve the efficiency of the backpropagation of gradients that is necessary to update the values of the parameters of the controller neural network. In particular, because data from only a few locations is being read to and written from, only a small number of non-zero gradients need to be passed back to the controller neural network. This can result in an improved training process without degrading the performance of the trained controller neural network.

Depending on the implementation, the system can maintain various degrees of persistence of the data stored in the external memory based on outputs received from the controller neural network. For example, in some implementations, the system re-sets the external memory after each sequence of system inputs has been fully processed by the system. As another example, in some implementations, the data stored in the external memory persists between input sequences. That is, the system does not delete any data from the external memory between sequences of system inputs. In these implementations, the system may re-set the external memory after a given task assigned to the system is completed and before the system begins a different machine learning task. Alternatively, the system may maintain the external memory without deleting values even between tasks. Thus, while processing a current input sequence, the system may be able to leverage data stored in the memory while processing a previous input sequence or even while performing a previous machine learning task.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a relationship graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A memory-augmented neural network system for processing a sequence of system inputs to generate a sequence of system outputs, the memory-augmented neural network system comprising:
   a controller neural network configured to receive a neural network input at each of a plurality of time steps and to process the controller neural network input to generate a neural network output for the time step, wherein each neural network output includes:
   a read key, and
   a write vector;
   an external memory that is external to the controller neural network; and
   a sparse memory access subsystem that is configured to, for each of the plurality of time steps:
      generate a sparse set of reading weights that includes a respective reading weight for each of a plurality of locations in the external memory using the read key, wherein the sparse set of reading weights are only non-zero for a first proper subset of the locations in the external memory;
      read data from the plurality of locations in the external memory in accordance with the sparse set of reading weights,
      generate a set of writing weights that includes a respective writing weight for each of the plurality of locations in the external memory, comprising:
         identifying a preceding set of sparse reading weights for the plurality of locations at a preceding time step;
         determining a least recently accessed location from the plurality of locations;
         determining a respective reading weight for each location other than the least recently accessed location from at least the reading weight for the location in the preceding set of sparse reading weights; and
         determining the writing weight for the least recently accessed location using the neural network output, wherein an interpolation parameter is included in the neural network output, and determining the writing weight for the least recently accessed location comprises performing an interpolation between the reading weight for the location at the preceding time step and a constant value in accordance with the interpolation parameter; and
      write the write vector to the plurality of locations in the external memory in accordance with the writing weights.

2. The system of claim 1, wherein the sparse set of reading weights includes only K non-zero weights, wherein K is a small predetermined integer that is equal to four or eight.

3. The system of claim 1, wherein the sparse memory access subsystem is configured to generate the sparse set of reading weights by:
   determining K locations of the plurality of locations that are most similar to the read key according to a similarity measure, wherein K is an integer that is less than a total number of locations in the plurality of locations;
   assigning a zero reading weight to each location of the plurality of locations other than the K locations; and
   determining the reading weight for each of the K locations from the similarity measure between the location and the read key.

4. The system of claim 3, wherein the sparse memory access subsystem is configured to determine the K locations using a k-nearest neighbors technique.

5. The system of claim 3, wherein the sparse memory access subsystem is configured to determine the K locations using an approximate nearest neighbor technique.

6. The system of claim 1, wherein the set of writing weights is a sparse set of weights that includes non-zero weights for only a proper subset of the plurality of locations.

7. The system of claim 6, wherein
   determining the writing weight for each location other than the least recently accessed location comprises:
      determining the writing weight for each location other than the least recently accessed location from the reading weight for the location at the preceding time step and the interpolation parameter.

8. The system of claim 7, wherein the sparse memory access subsystem is configured to determine the least recently accessed location by:
   maintaining a respective usage value for each of the plurality of locations; and
   selecting the location having the smallest usage value as the least recently accessed location.

9. The system of claim 8, wherein the respective usage value for each of the plurality of locations is a time discounted sum of the write weights for the location over preceding time steps.

10. The system of claim 8, wherein the respective usage value for each of the plurality of locations is a number of time steps since a most recent time step at which a sum of a reading weight for the location and a writing weight for the location exceeded a predetermined threshold value.

11. The system of claim 7, wherein the sparse memory access subsystem is further configured to, for each of the plurality of time steps:
erase the data stored in the least recently accessed location.

12. The system of claim 1, wherein the system further includes one or more output layers, and wherein the one or more output layers are configured to, for each of the plurality of time steps:
process the data read from the external memory for the time step to generate a system output for the time step.

13. The system of claim 1, wherein the neural network output for each of the plurality of time steps further includes a system output portion.

14. The system of claim 13, wherein the sparse memory access subsystem is further configured to, for each of the plurality of time steps, provide an output derived from the system output portion as a system output for the time step.

15. The system of claim 13, wherein the system further includes one or more output layers, and wherein the one or more output layers are configured to, for each of the plurality of time steps:
process the data read from the external memory and the system output portion for the time step to generate a system output for the time step.

16. The system of claim 1, wherein the controller neural network input for each time step is a respective system input from the sequence of system inputs.

17. The system of claim 1, wherein the sparse memory access subsystem is further configured to, for each of the plurality of time steps:
combine the data read from the external memory and a respective system input from the sequence of system inputs to generate a subsequent neural network input for a subsequent time step.

18. One or more non-transitory storage media storing instructions that when executed by one or more computers cause the one or more computers to perform operations for processing a sequence of system inputs to generate a sequence of system outputs, the operations comprising, at each of a plurality of time steps:
processing a neural network input at the time step using a controller neural network, wherein the controller neural network is configured to receive a neural network input at each of the plurality of time steps and to process the controller neural network input to generate a neural network output for the time step, wherein each neural network output includes:
a read key, and
a write vector;
generating a sparse set of reading weights that includes a respective reading weight for each of a plurality of locations in an external memory using the read key in the neural network output for the time step, wherein the external memory is external to the controller neural network, and wherein the sparse set of reading weights are only non-zero for a first proper subset of the locations in the external memory;
reading data from the plurality of locations in the external memory in accordance with the sparse set of reading weights;
generating a set of writing weights that includes a respective writing weight for each of the plurality of locations in the external memory, comprising:
identifying a preceding set of sparse reading weights for the plurality of locations at a preceding time step;
determining a least recently accessed location from the plurality of locations;
determining a respective reading weight for each location other than the least recently accessed location from at least the reading weight for the location in the preceding set of sparse reading weights; and
determining the writing weight for the least recently accessed location using the neural network output, wherein an interpolation parameter is included in the neural network output, and determining the writing weight for the least recently accessed location comprises performing an interpolation between the reading weight for the location at the preceding time step and a constant value in accordance with the interpolation parameter; and
writing the write vector to the plurality of locations in the external memory in accordance with the writing weights.

19. A method for processing a sequence of system inputs to generate a sequence of system outputs, the method comprising, at each of a plurality of time steps:
processing a neural network input at the time step using a controller neural network, wherein the controller neural network is configured to receive a neural network input at each of the plurality of time steps and to process the controller neural network input to generate a neural network output for the time step, wherein each neural network output includes:
a read key, and
a write vector;
generating a sparse set of reading weights that includes a respective reading weight for each of a plurality of locations in an external memory using the read key in the neural network output for the time step, wherein the external memory is external to the controller neural network, and wherein the sparse set of reading weights are only non-zero for a first proper subset of the locations in the external memory;
reading data from the plurality of locations in the external memory in accordance with the sparse set of reading weights;
generating a set of writing weights that includes a respective writing weight for each of the plurality of locations in the external memory, comprising:
identifying a preceding set of sparse reading weights for the plurality of locations at a preceding time step;
determining a least recently accessed location from the plurality of locations;
determining a respective reading weight for each location other than the least recently accessed location from at least the reading weight for the location in the preceding set of sparse reading weights; and
determining the writing weight for the least recently accessed location using the neural network output, wherein an interpolation parameter is included in the neural network output, and determining the writing weight for the least recently accessed location comprises performing an interpolation between the reading weight for the location at the preceding time step and a constant value in accordance with the interpolation parameter; and writing the write vector to the plurality of locations in the external memory in accordance with the writing weights.

20. The method of claim 19, wherein generating the sparse set of reading weights comprises:
    determining K locations of the plurality of locations that are most similar to the read key according to a similarity measure, wherein K is an integer that is less than a total number of locations in the plurality of locations;
    assigning a zero reading weight to each location of the plurality of locations other than the K locations; and
    determining the reading weight for each of the K locations from the similarity measure between the location and the read key.

* * * * *